United States Patent Office 3,050,278
Patented Aug. 21, 1962

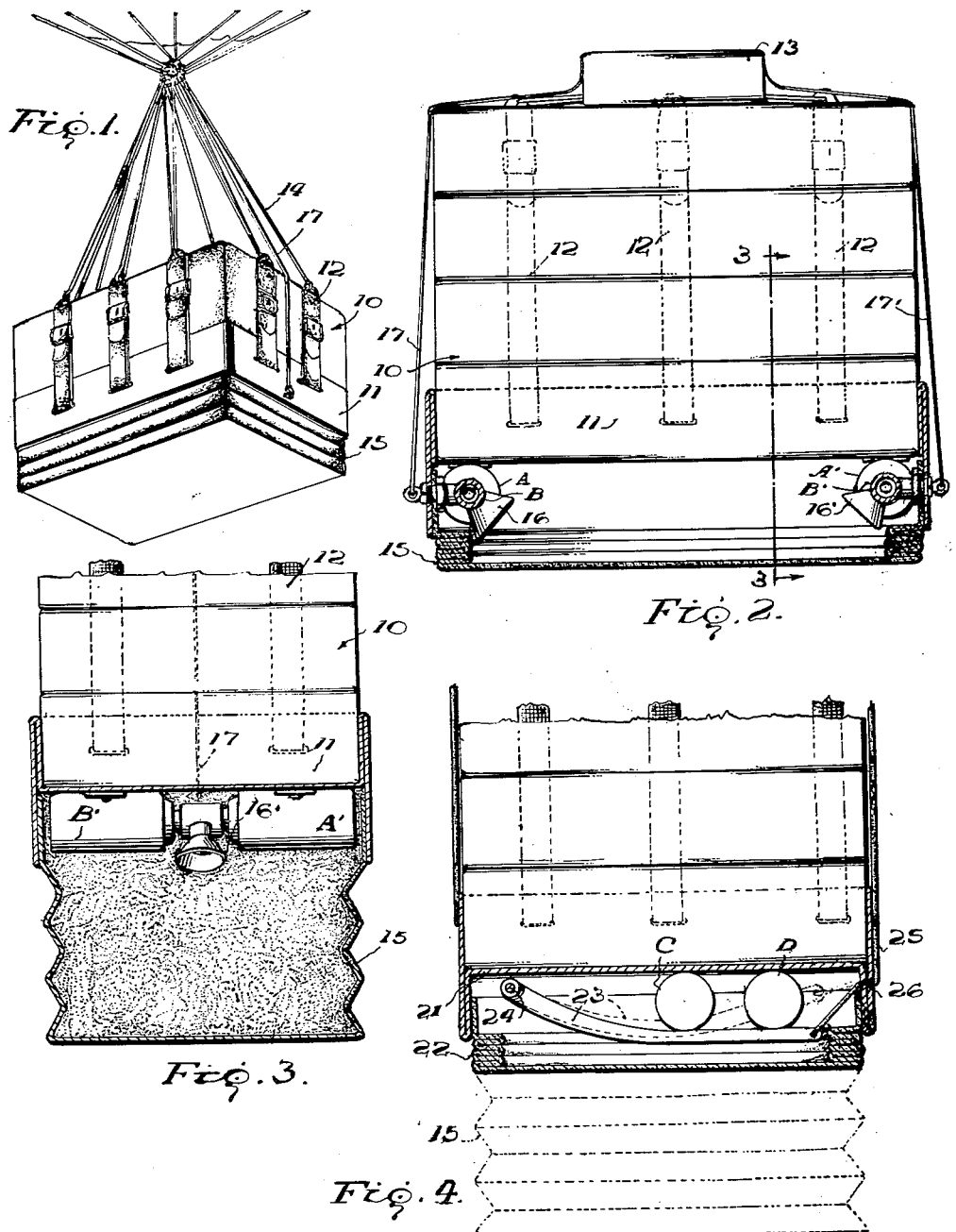

3,050,278
GROUND-CONTACT SHOCK ABSORBING SYSTEM
Charles N. Gardner, Suitland, Md., and Jack F. Furrer, Wayland, and George E. Murray, Lexington, Mass., assignors to the United States of America as represented by the Secretary of the Army
Filed July 19, 1961, Ser. No. 125,280
13 Claims. (Cl. 244—138)
(Granted under Title 35, U.S. Code (1952), sec. 266)

The invention described herein, if patented, may be manufactured and used by or for the Government for governmental purposes, without the payment to us of any royalty thereon.

This invention relates to a method and device for absorbing the ground-contact shock of a load ejected from an aircraft, and more particularly concerns an expansible platform, which is caused to expand during the descent of the load, by the instantaneous formation in situ of a cellular solid foam, e.g., of the polyurethane resin type.

A cargo air drop is effected either by means of parachute-borne loads or by free drop. The latter method is rarely practiced, and is only practical if a load is so compact that it can withstand a severe shock on ground contact. On the other hand, delivery of heavy cargo by parachute necessitates the use of large canopies (one or more) which are expensive, difficult to pack, and consume material that is likely to be critical in war time such as nylon. It has also been proposed to combine both methods, by using a smaller parachute canopy than would ordinarily be required for successful aerial delivery, and a shock-absorbing platform of paper, e.g., honeycomb shaped paper, or a hollow platform filled with plastic cellular foam of the polystyrene type. These platforms have the disadvantage of occupying a substantial amount of cargo space in the airplane and thereby greatly reduce the payload that can be delivered by the plane.

We have now found that an expansible platform can be provided which, when collapsed, occupies no more space in the airplane than a conventional load pallet. This platform, when attached to the load and ejected therewith from an airplane, is capable of expanding to a substantial depth, by the release into the inner space of the platform of solid cellular foam forming agents. On ground contact, the foam is crushed and thereby absorbs the energy of the ground impact.

Accordingly, it is a principal object of our invention to provide a ground contact shock absorbing platform which occupies a minimum of cargo space prior to ejection from an airplane and which expands to a substantial depth after ejection.

An equally important object of our invention is a method of a absorption of ground contact shock by providing a deep solid cellular foam layer beneath the load, which is formed during descent of the load.

A further object of our invention is an aerial delivery system which dispenses with the need for large-canopied parachutes.

A further object of our invention is a simple and reliable foam forming system incorporated in an aerial delivery platform.

Still further objects and advantages of our invention will become apparent from the following description of a principal embodiment of our invention and of a modified embodiment of the same.

In the accompanying drawings:

FIGURE 1 shows a perspective view of a load immediately after ejection from an airplane, and provided with a shock-absorbing platform in accordance with our invention;

FIGURE 2 is a front elevational view, partly in section, showing the same load and platform, before actuation of the foam forming devices embodied therein;

FIGURE 3 is a side elevational view, partly in section, corresponding to FIGURE 2, and showing the platform substantially fully expanded;

FIGURE 4 is a front elevational view, partly in section, of a modification of the embodiment shown in FIGURE 2.

It will be understood, of course, that the drawings, as well as the following description thereof, are for purposes of illustration, and are not to be deemed as limitations upon the scope of our invention.

More particularly, reference numeral 10 denotes an air dropped cargo, as, for instance, a packaged engine. Cargo 10 is strapped to platform 11 by means of straps 12. A stabilizing parachute 13 (shown undeployed in FIGURE 2) is connected to the composite platform load by means of lines 14, principally for the purpose of preventing the load from tumbling during the drop.

Bellows 15 are nested in the underside of platform 11, in such a way that they do not protrude appreciably (or at all) beyond the lower edge of the platform prior to actuation of the foam forming device. This effects a saving of cargo space in the airplane prior to load ejection. However, after ejection from the airplane, solid plastic foam is formed inside the bellows in a manner about to be described, and expands them to a depth of several feet.

In the embodiment shown in FIGURES 1 to 3, this solid plastic foam is formed after ejection of the load from the airplane, as follows. Aerosol containers A and B, filled with foam forming components and a pressurized propelling fluid such as Freon, are disposed to either side of mixing valve 16 at one side of the platform, and corresponding containers A' and B' are disposed to the other side of mixing valve 16' at the other side of the platform.

The mouths of the aerosol containers are connected to the mixing valve, and are closed by it (e.g., by means of a conventional reciprocable plug; not shown) until the mixing valve is actuated in a manner about to be described.

Cords 17, 17' are connected at one end thereof to mixing valves 16, 16'. The other end of each of these cords is connected to a load line 14 of the orienting parachute 13. Upon deployment of the orienting parachute 13, load lines 14 are pulled taut, and cords 17, 17' are pulled upwardly. This opens mixing valves 16, 16' and the mouths of aerosol containers A, B, and A', B', and injects their contents through mixing valves 16, 16', into the interior of bellows 15. A cellular plastic foam forms within a few seconds, and causes the bellows to expand to a position shown in FIGURE 3. The orienting parachute 13 assures that expanded bellows 15 hit the ground first. The ground impact energy is dissipated by crushing the foam and bursting the bellows, and the cargo 10 and platform 11 come to rest gently as the latter settles in the crushed foam.

In the modification shown in FIGURE 4, the foam-forming ingredients are placed in separate containers C and D and nested inside the lower portion of platform 21 and surrounded by collapsed bellows 22. These containers are of thin-walled rupturable plastic. Lever 23 is pivoted to the underside of platform 21 at 24, laterally of containers C and D, and the other end of lever 23 is connected to one end of cord 25 through a small aperture 26 in bellows 22. The other end of cord 25 is connected to a load line of the orienting parachute (not shown in FIGURE 4). Upon ejection of the platform load from the aircraft, and deployment of the orienting parachute, cord 25 pulls lever 23 upwardly around pivot point 24. This causes a shearing action on containers C and D, with resulting breakage of both containers and ejection of their foam forming contents into bellows 22, causing them to expand to a depth of several feet as shown in dotted lines in FIGURE 4. Upon ground contact, this arrangement functions in the same way as the embodiment of FIGURES 2 and 3, i.e., dissipates the ground contact energy by crushing the foam. In this modification, the mixing of the foam forming components takes place principally by gravity.

In either embodiment, the sides of bellows 15 are made of flexible material such as strong coated paper, fabric, flexible plastic, or other suitable material; the bottom of bellows may be made, e.g., of plain or corrugated cardboard, or plywood.

An instantly forming solid foam system which is formed by the chemical inter-action of two separately containerized foam forming systems, has been developed for use in our invention. Such a system and a modification thereof will now be described, but are to be deemed as illustrative only as obviously other systems of equivalent functions can be provided by use of chemical equivalents.

*Example 1.—Formation of Polyurethane Foam*

The first foam-forming component (in container A) is a mixture of the following components:

| | Parts |
|---|---|
| N,N,N',N' tetrakis (2-hydroxypropyl) ethylene diamine (catalyst) | 23.8 |
| Castor oil | 15.9 |
| Triallyl cyanurate | 11.9 |
| Glyceryl monoricinoleate | 11.3 |
| Petromix No. 9 (or other wetting agent) | 1.8 |
| Witco 77/86 (or other wetting agent) | 1.8 |
| Water | 1.4 |
| Ethyl cellulose N-100 | 5.4 |

The second foam-forming component (in container B) is toluene diisocyanate, 80.0 parts.

These components, when expelled through the mixing valve under the pressure of the Freon or other pressure fluid, with which containers A and B are charged, rapidly forms a cellular solid self-curing crushable polyurethane foam expanding within about 5 to 10 seconds to about 30 to 60 times of its original volume, and filling the platform bellows.

The "parts" of the foregoing table may be ounces or fractions or multiples of ounces, depending on the size of the containers.

In lieu of the castor oil and/or glyceryl monoricinoleate of the first component, there may be substituted a suitable hydroxyl terminated unsaturated polyester.

Petromix No. 9 is a commercial wetting agent supplied by L. Sonneborn & Sons, New York city, and is used to disperse the water in the resin. Witco 77/86 is also a commercial wetting agent supplied by the Witco Chemical Co., New York city, and is used as a foaming assistant. Other commercially available wetting agents may be substituted for either or both.

*Example 2.—Formation of Gas Blowing Polyvinyl Foam*

The first foam-forming component (container A) is a mixture of the following components:

| | Parts |
|---|---|
| Vinyl toluene (containing 5% Hycar 1312 butadiene copolymer) | 23 |
| Aluminum stearate | 1 |
| Dinitroso pentamethylene diamine (or other gas blowing agent) | 0.1 |

The second foam-forming component (container B) is an ethyl ether solution of 0.8 part aluminum chloride, which acts as an ionic catalyst.

These components form a foam in a similar manner and to a similar consistency as in Example 1.

The term "parts" in Example 2 has the same meaning as in Example 1.

In lieu of the vinyl toluene of Example 2, other vinyl monomers, such as styrene, isobutylene, or vinyl-2-chloroethyl ether may be substituted. The aluminum stearate of the first component is a viscosity stabilizer, and may be replaced by a functional equivalent such as a liquid butadiene acrylonitrile copolymer.

Other gas-blowing agents, known in the art may be substituted in lieu of dinitroso pentamethylene diamine, so long as they are able to evolve a gas in the presence of the second component (e.g. aluminum chloride). Examples of such compounds are diazoaminobenzene, p,p'oxybis-(benzene sulfonyl-hydrazide), benzosulfohydrazide, or similar organic compounds which liberate nitrogen gas. The ionic catalyst (second component) may be aluminum chloride, boron trifluoride, stanic chloride, or other electron acceptor (Lewis type acid).

The foams of Examples 1 and 2 are also suitable for use in the modification illustrated in FIGURE 4 of the drawing, without the use of Freon or other pressure fluid.

While we prefer the use of an orienting parachute in conjunction with our system, the orienting parachute is not indispensable, if the cargo is packed in such a way that the center of gravity is well below its geometrical center, i.e., is located near the bottom of the load. In such a case, the actuating cords are attached to a conventional static line (not shown).

It will also be understood that the practice of our invention is not limited to the air dropping of freight, as it also can be used in connection with a pilot ejection seat, wherein the seat would take the place of platform 11. The remainder of the system will function in the same manner as is shown in FIGURES 1 to 3.

Also, platform 11 together with the operating parts located in its interior (as shown in FIGURES 1 to 3) may be connected to or built into the bottom of a helicopter or similar aircraft for the purpose of softening the ground impact shock in case of a crash landing; in such an event, the actuating cords are operated by the pilot when the emergency arises. Thus, the term "load" as used in the specification and claims is also intended to encompass these embodiments, i.e., pilot ejection seats, helicopter fuselages, and the like.

Having thus described the principle of our invention and several ways of carrying the same into practice, it is readily apparent that departures and modifications may be made from the disclosed details of our invention, while still remtaining within its spirit and scope. We thus wish it to be understood that such modification and departures are deemed to be covered by the appended claims.

We claim:

1. Method of absorbing the ground-contact shock of a load ejected from an aircraft, comprising attaching an expansible platform to said load prior to ejection from said aircraft, and rapidly forming a cellular solid foam within said expansible platform after ejection from said aircraft.

2. Method of absorbing the ground-contact shock of a load ejected from an aircraft, comprising attaching an expansible platform, to said load prior to ejection from said aircraft, and rapidly forming a cellular solid foam in said expansible platform by mixing a plurality of foam-forming materials inside said platform after ejection from said aircraft.

3. Method according to claim 2, wherein said materials are propelled from pressurized containers after ejection from said aircraft.

4. Method according to claim 2, wherein said materials are confined in rupturable containers prior to ejection from said aircraft, and wherein said containers are ruptured after ejection from said aircraft.

5. Method according to claim 1, wherein said cellular foam is a polyurethane foam.

6. Method according to claim 1, wherein said cellular foam is a gas-blown polyvinyl foam.

7. Ground-contact shock absorbing device comprising an expansible platform, means for attaching said platform to a load, and means within said platform for rapidly forming a cellular solid foam after ejection of said load and attached platform from an aircraft.

8. Ground-contact shock absorbing device comprising an expansible platform, means for attaching said platform to a load, and means within said platform for rapidly forming a cellular solid foam after ejection of said load and attached platform from an aircraft, said means comprising a plurality of pressurized containers for segregated materials which are capable of rapidly producing a cellular solid foam upon being mixed.

9. Ground-contact shock absorbing device comprising an expansible platform, means for attaching said platform to a load, and means within said platform for rapidly forming a cellular solid foam after ejection of said load and attached to platform from an aircraft, said means comprising a plurality of rupturable containers for segregated materials which are capable of rapidly producing a cellular solid foam upon being mixed.

10. Device according to claim 7, wherein said foam is a polyurethane foam.

11. Device according to claim 7, wherein said foam is a gas blown polyvinyl foam.

12. Method of absorbing the ground-contact shock of a descending load, comprising attaching an expansible platform to said load prior to its descent, and rapidly forming a cellular solid foam within said expansible platform during the descent of said load.

13. Ground-contact shock absorbing device for a decending load, comprising an expansible platform attached to said load, and means within said platform for rapidly forming a cellular solid foam during the descent of said load.

References Cited in the file of this patent

UNITED STATES PATENTS

| | | |
|---|---|---|
| Re. 24,767 | Simon et al. | Jan. 19, 1960 |
| 2,653,139 | Sterling | Sept. 22, 1953 |
| 2,779,689 | Reis | Jan. 29, 1957 |
| 2,860,856 | Bauer | Nov. 18, 1958 |
| 2,974,912 | Namsick | Mar. 14, 1961 |
| 2,989,938 | Patterson | June 27, 1961 |
| 3,010,540 | Dahlen | Nov. 28, 1961 |

UNITED STATES PATENT OFFICE

CERTIFICATE OF CORRECTION

Patent No. 3,050,278                                August 21, 1962

Charles N. Gardner, et al.

It is hereby certified that error appears in the above numbered patent requiring correction and that the said Letters Patent should read as corrected below.

Column 5, line 17, strike out "to".

Signed and sealed this 11th day of December 1962.

(SEAL)
Attest:

ERNEST W. SWIDER                              DAVID L. LADD
Attesting Officer                                 Commissioner of Patents